United States Patent Office 3,714,251
Patented Jan. 30, 1973

3,714,251
PROCESS FOR THE PRODUCTION OF OXAMIDE
Theodor Lussling and Ferdinand Theissen, Grossauheim, and Wolfgang Weigert, Offenbach am Main, Germany, assignors to Deutsche Gold- und Silber-Scheideanstalt vormals Roessler, Frankfurt, Germany
No Drawing. Filed Apr. 8, 1970, Ser. No. 26,745
Claims priority, application Germany, Apr. 16, 1969, P 19 19 287.1
Int. Cl. C07c 103/08
U.S. Cl. 260—561 K
18 Claims

ABSTRACT OF THE DISCLOSURE

Oxamide is produced by the hydrolysis of cyanogen with water in the presence of hydrogen halide in an organic solvent such as sulfones, ketones, cyclic and acyclic ethers.

---

The present invention is directed to a process for the product of oxalic acid diamide (oxamide) from cyanogen (dicyanogen).

It is known to produce oxamide by ammonolysis of oxalic acid diesters (Liebig's Ann. Chem. 9 (1834), 12, 130) or dehydration of ammonium oxalate (J. Amer. Chem. Soc. 29 (1907) 1137). Additionally there are known various processes for obtaining oxamide by hydrolysis of cyanogen. These can be accomplished for example by treatment with an aldehyde (Liebig's Ann. Chem. 113 (1860) 246) or with aqueous hydrochloric acid (Chem. Ber. 1 (1867) 66). In the use of hydrochloric acid it is necessary to maintain lower temperatures if the conversion to oxamide is to be favored and the side reaction to oxalic acid suppressed (U.S. Pat. 1,194,354). It is further known to carry out the hydrolysis of cyanogen in aqueous mixtures of hydrogen chloride, acetic acid and acetic anhydride (U.S. Pat. 3,037,055). We have also proposed in our copending application 803,065 filed Feb. 27, 1969, to prepare oxamide by reacting cyanogen with a carboxylic acid and a hydrogen halide or carboxylic acid halide under anhydrous conditions. With the exception of the process of our copending application to obtain higher yields it is necessary to employ a conversion time of several days. This can of course be shortened by the use of elevated pressure and temperature, however, at elevated temperature the side reaction of the formation of oxalic acid is favored. Similar behavior is noted in the process of hydrolysis of cyanogen in an aqueous mixture of hydrochloric acid and sulfuric acid or phosphoric acid (U.S. Pat. 3,354,207). So far from the little data available although short residence times are obtained, the space-time-yields are very low.

There has now been found a process for the production of oxamide by hydrolysis of cyanogen with water in the presence of hydrogen halide, in a given case at elevated temperature and/or elevated pressure which is characterized in that the hydrolysis is carried out in organic solvents of the types specified below.

According to the process of the invention there is obtained oxamide in very pure, mostly even analytical pure form. While according to the known processes (except that of our copending application 803,065) it is preferred to work at low temperatures up to 30° C. to avoid side reactions, with the process of the invention higher temperatures up to 120° C. are used with advantage so that considerably greater conversion speeds can be attained. The side reaction resulting in the formation of oxalic acid does not occur in spite of the higher temperature or occurs only in a very minor amount. Furthermore an especial advantage is that the cyanogen possesses considerably greater solubility than in the media provided by the known processes. Per unit of volume and time considerably more oxamide can be produced, that is considerably higher space-time-yields are attained.

As solvents for carrying out the process of the invention there are used organic liquids or solutions of organic liquid with each other or of solids in liquids which do not have a disturbing influence on the conversion. Especially suitable are solvents which have a high or unlimited dissolving power for water. There can also be used, however, solvents which dissolve only small amounts of water. Advantageously there are employed cyclic sulfones such as tetramethylene sulfone or substituted tetramethylene sulfones, for example 3-methyl tetramethyl sulfone, 3.4-dimethyl tetramethylene sulfone, 3.4-dichloro tetramethylene sulfone, acyclic sulfones such as dimethyl sulfone, diethylsulfone, dipropyl sulfone, diisopropyl sulfone, 2.2'-dimethoxy diethyl sulfone, ketones such as acetone, methyl ethyl ketone, methyl n-propyl ketone, methyl isopropyl ketone, diethyl ketone, methyl n-butyl ketone, pinacolone, methyl n-amyl ketone, ethyl n-butyl ketone, di n-propyl ketone, diisopropyl ketone, cyclopentanone, cyclohexanone, acetophenone, cyclic ethers such as dioxane, tetrahydrofurane, dioxolane, acyclic ethers such as ethylene glycol dimethyl ether, diethylene glycol dimethyl ether, ethylene glycol diethyl ether, ethylene glycol dibutyl ether, diethyl ether, diisopropyl ether, diisoamyl ether, diphenyl ether or mixtures, for example a mixture of 17 to 83% dimethyl sulfone and dioxane. Especially advantageous is the use of sulfones. The use of carboxylic acids and alcohols is not claimed.

The addition of water is measured so that the necessary amount of water for the hydrolysis and more appropriately an excess is present. Advantageously an excess of at least 0.3 mole of water is used. Preferably the excess water should not be over 15 moles. All of the necessary water can either be added at the beginning or only a part added at the beginning and the rest added to the material during the conversion as water becomes consumed.

The amount of solvent conforms in a given case to the nature of the solvent and the conversion conditions. There can be used volume proportions of solvent to water of from 200:1 to 1:4, preferably 10:1 to 1:1.

As the catalysts there can be added halogen halides, preferably hydrogen chloride, although other hydrogen halides can be used such as hydrogen bromide. The hydrogen halide can be introduced in gaseous form, in a given case under pressure, into the solvent present or mixture of solvent and water or else added to the solvent as an aqueous solution entirely or partially in place of water. The amount of hydrogen halide is expediently so measured that there is present at least 0.2, preferably at least 2 moles of hydrogen halide per mole of cyanogen. There is no advantage in using more hydrogen halide since it is wasteful but there can be used for example up to 15 moles of hydrogen halide per mole of cyanogen.

The cyanogen is added preferably as a gas, in a given case together with the hydrogen halide, in a given case under pressure. It can, however, also be dissolved entirely or partially in the solvent employed, in a given case together with the hydrogen halide. For the cyanogen there can be treated a product that comes directly from the conversion of hydrocyanic acid with chlorine, nitrogen oxides or air and accordingly is mixed with hydrogen chloride, nitrogen oxides or nitrogen.

The process of the invention is carried out advantageously at normal pressure or elevated pressure up to 50 atmospheres and at temperatures between 0 and 120° C. Preferably pressures of 1 to 5 atmospheres and temperatures between 40 and 90° C. are used.

After the conversion the oxamide formed, which separates from the reaction mixture as crystals is recovered in known manner by filtration. The mother liquor consisting essentially of solvent and aqueous hydrochloric acid can be used for the hydrolysis of additional cyanogen.

The resulting oxamide is generally so pure that it finds use for every purpose. It can serve as an intermediate produce and is especially employed directly as a fertilizer.

Unless otherwise indicated all parts and percentages are by weight.

EXAMPLE 1

A mixture of 6.4 grams of cyanogen and 9.1 grams of hydrogen chloride were introduced into 200 grams of cyclotetramethylene sulfone that contained 2.6% by weight of water at a temperature of 50 and 60° C. at a pressure of 1 atmosphere in the course of 60 minutes. The precipitated oxamide was separated by filtration. The yield amounted to 9.8 grams, corresponding to 91% based on the cyanogen used. The product was analytically pure.

EXAMPLE 2

280 grams of cyclotetramethylene sulfone with a water content of 2.6 weight percent were saturated with hydrogen chloride in an autoclave. The solution thus prepared contained 8.2 weight of percent hydrogen chloride. 7.5 grams of cyanogen were introduced in the course of 20 minutes into this solution at a pressure of 3 to 5 atmospheres and a temperature of 50° C. After the end of the cyanogen addition, the exothermically proceeding reaction persisted for several minutes. After 60 minutes, when the reaction mixture was cooled to 25° C. the separated oxamide was separated off by filtration. The yield amounted to 12.2 grams, correspondingly to 96%, the product was analytically pure.

EXAMPLE 3

35.8 grams of cyanogen were introduced into 260 grams of a mixture of 81.5 weight percent of cyclotetramethylene sulfone, 9.0 weight percent water and 9.5 weight percent hydrogen chloride at a pressure of 4 atmospheres and at a temperature up to 55° C. After a total of 60 minutes when the reaction mixture had cooled by itself to 25° C. the oxamide was separated off. There were recovered 58.6 grams, corresponding to 96.7% of analytically pure oxamide.

EXAMPLE 4

Hydrogen chloride was introduced into an autoclave containing 400 grams of cyclotetramethylene sulfone which contained 30% of water until the solution contained 14 weight percent of hydrogen chloride. 21 grams of cyanogen were introduced into this solution at a pressure of 4 atmospheres and a temperature up to 57° C. in the course of 15 minutes. After a further 15 minutes the reaction was complete, the temperature meantime had fallen to 47° C. There were recovered 33.5 grams, corresponding to 94.3%, of analytically pure oxamide.

EXAMPLE 5

300 ml. of acetone and 100 ml. of concentrated aqueous hydrochloric acid were mixed in an autoclave and 33.6 grams of cyanogen were introduced into this solution at a pressure up to 5 atmospheres and a temperature up to 85° C. The reaction took 60 minutes. There were recovered 52.5 grams of oxamide, corresponding to a yield of 92.4% based on the cyanogen used.

EXAMPLE 6

11 grams of cyanogen were reacted in an autoclave in a mixture of 12.4 grams of dimethyl sulfone 62.0 grams of p-dioxane and 49.6 grams of 36% aqueous hydrochloric acid at a pressure up to 4.5 atmospheres and a temperature up to 60° C. The reaction lasted 60 minutes. There were recovered 17 grams of oxamide, corresponding to a 91.3% yield based on the cyanogen used.

EXAMPLE 7

A solution of 240 grams of water in 2160 grams of cyclotetramethylene sulfone were placed in a reaction system that consisted of 3 stirrer vessels connected in series. A gaseous mixture of 116 grams of cyanogen and 163 grams of hydrogen chloride were introduced at normal pressure and a reaction temperature of 50° C. in the course of 5 hours and brought to reaction. After one hour additional reaction there were recovered 191 grams of oxamide, corresponding to a yield of 97.1% based on the cyanogen used.

EXAMPLE 8

A solution of 240 grams of water in 2160 grams of cyclotetramethylene sulfone were present in the reaction system described in Example 7 and was brought to a hydrogen chloride content of 9 weight percent. At normal pressure and a reaction temperature of 50° C. in the course of 4.5 hours there were introduced into this solution a gaseous mixture of 94 grams of cyanogen and 138 grams of nitrogen-monooxide-nitrogen dioxide (molar proportion about 1:1) and brought to reaction. After one hour of additional reaction there were recovered 151 grams of oxamide, corresponding to a yield of 94.8% based on the cyanogen used.

What is claimed is:

1. In a process for the production of oxamide by hydrolyzing cyanogen with water in the presence of hydrogen halide selected from the group consisting of hydrogen chloride and hydrogen bromide, the improvement comprising carrying out the process in a solvent which does not have a disturbing influence on the conversion, is free of hydroxyl and carboxylic acid groups and is selected from the group consisting of ketones, ethers and sulfones.

2. A process according to claim 1 wherein the solvent is selected from the group consisting of tetramethylene sulfone, 3-methyl tetramethylene sulfone, 3,4-dimethyl tetramethylene sulfone, 3,4-dichloro tetramethylene sulfone, dimethyl sulfone, diethyl sulfone, dipropyl sulfone, diisopropyl sulfone, 2,2'-dimethoxy diethyl sulfone, acetone, methyl ethyl ketone, methyl n-propyl ketone, methyl isopropyl ketone, diethyl ketone, methyl, n-butyl ketone, pinacolone, methyl n-amyl ketone, ethyl n-butyl ketone, di n-propyl ketone, diisopropyl ketone, cyclopentanone, cyclohexanone, acetophenone, dioxane, tetrahydrofurane, dioxolane, ethylene glycol dimethyl ether, diethylene glycol dimethyl ether, ethylene glycol diethyl ether, ethylene glycol dibutyl ether, diethyl ether, diisopropyl ether, diisoamyl ether and diphenyl ether.

3. A process according to claim 1 wherein the amount of water employed is in excess of the amount required to hydrolyze the cyanogen by an amount of 0.3 to 15 moles.

4. A process according to claim 2 wherein the hydrolysis is carried out at 0 to 120° C.

5. A process according to claim 4 wherein the temperature is between 40 and 90° C.

6. A process according to claim 4 wherein the pressure is between atmospheric and 50 atmospheres.

7. A process according to claim 6 wherein the superatmospheric pressure is 1 to 5 atmospheres and the temperature is 40 to 90° C.

8. A process according to claim 1 wherein the solvent is a sulfone.

9. A process according to claim 8 wherein the solvent is cyclotetramethylene sulfone.

10. A process according to claim 1 wherein the solvent is a ketone.

11. A process according to claim 10 wherein the ketone is acetone.

12. A process according to claim 2 wherein the solvent is an ether.

13. A process according to claim 12 wherein the ether is an acylic ether.

14. A process according to claim 13 wherein the ether is ethylene glycol dimethyl ether.

15. A process according to claim 12 wherein the ether is a cyclic ether.

16. A process according to claim 15 wherein the ether is dioxane or tetrahydrofurane.

17. A process according to claim 2 wherein the solvent is a mixture of dimethyl sulfone and an ether.

18. A process according to claim 2 wherein the hydrogen halide is hydrogen chloride.

References Cited

UNITED STATES PATENTS

| 1,194,354 | 8/1916 | Bucher | 260—561 |
| 3,354,207 | 11/1967 | Patterson | 260—561 |

LEWIS GOTTS, Primary Examiner

E. G. LOVE, Assistant Examiner